United States Patent [19]

Cioletti

[11] Patent Number: 5,119,956
[45] Date of Patent: Jun. 9, 1992

[54] JAM PROOF CLOSURE ASSEMBLY FOR LIDDED PRESSURE VESSELS

[75] Inventor: Olisse C. Cioletti, Pittsburgh, Pa.

[73] Assignee: The United States of America as represented by the United States Department of Energy, Washington, D.C.

[21] Appl. No.: 643,295

[22] Filed: Jan. 22, 1991

[51] Int. Cl.⁵ .............................. B65D 45/00
[52] U.S. Cl. .................... 220/327; 411/182; 411/353; 411/512; 376/205; 220/233; 220/240; 220/328
[58] Field of Search ............... 220/327, 328, 233, 240, 220/253, 304, DIG. 17, 235; 411/178, 182, 353, 352, 512, 517, 518, 519; 376/205, 206

[56] References Cited

U.S. PATENT DOCUMENTS

| | | | |
|---|---|---|---|
| 942,171 | 12/1909 | Ecaubert | 220/328 |
| 2,009,324 | 7/1935 | Pullin | 220/304 |
| 2,635,785 | 4/1953 | Gross | 220/328 |
| 2,690,275 | 9/1954 | Alt et al. | 220/328 |
| 2,690,276 | 9/1954 | Alt | 220/328 |
| 2,774,508 | 12/1956 | Larsen | 411/519 X |
| 2,816,679 | 12/1957 | Tinker | 220/304 X |
| 2,822,109 | 2/1958 | Tangard | 220/233 |
| 2,903,152 | 9/1959 | Kuo | 220/328 |
| 3,018,127 | 1/1962 | Dobrosielski et al. | 220/327 X |
| 3,112,842 | 12/1963 | Perl | 220/328 |
| 3,125,240 | 3/1964 | Gerard et al. | 220/328 |
| 3,185,337 | 5/1965 | Long | 220/233 |
| 3,212,508 | 10/1965 | Fassbender | 411/519 X |
| 3,298,794 | 1/1967 | Mikesell, Jr. et al. | 376/205 |
| 3,464,581 | 9/1969 | Polcer | 220/327 X |
| 3,522,901 | 8/1970 | Rauschenplat | 220/327 |
| 3,616,586 | 11/1971 | Mottram | 220/327 X |
| 3,955,463 | 5/1976 | Hoehn | 85/36 |
| 4,117,261 | 9/1978 | Blevins et al. | 174/164 |
| 4,174,008 | 11/1979 | Preziosi et al. | 411/353 |
| 4,239,124 | 12/1980 | Inouye | 220/240 |
| 4,285,380 | 8/1981 | Gulistan | 411/103 |
| 4,347,945 | 9/1982 | Fehlau | 220/327 |
| 4,606,688 | 8/1986 | Moran et al. | 411/175 |

Primary Examiner—Stephen P. Garble
Assistant Examiner—Vanessa Caretto
Attorney, Agent, or Firm—Virginia B. Caress; William R. Moser; Richard E. Constant

[57] ABSTRACT

An expendable closure assembly is provided for use (in multiple units) with a lockable pressure vessel cover along its rim, such as of an autoclave. This assembly is suited to variable compressive contact and locking with the vessel lid sealing gasket. The closure assembly consists of a thick walled sleeve insert for retention in the under bores fabricated in the cover periphery and the sleeve is provided with internal threading only. A snap serves as a retainer on the underside of the sleeve, locking it into an under bore retention channel. Finally, a standard elongate externally threaded bolt is sized for mating cooperation with the so positioned sleeve, whereby the location of the bolt shaft in the cover bore hole determines its compressive contact on the underlying gasket.

14 Claims, 2 Drawing Sheets

JAM PROOF CLOSURE ASSEMBLY FOR LIDDED PRESSURE VESSELS

GOVERNMENT CONTRACT RIGHTS

The present invention was made or conceived in the course of or under United States Government Contract No. DE-AC11-76PN00014 entered into with or for the benefit of the Department of Energy, according to which the Government has certain rights thereto.

TECHNICAL FIELD OF THE INVENTION

This invention relates to improved closure assemblies for lidded pressure loadable processing vessels, like autoclaves. It relates more especially to a jam proof closure assembly that replaces the conventional bolts being taken up by tapped apertures that are usually provided in the ring periphery of a standard lidded member for various pressure vessels.

BACKGROUND OF THE INVENTION

In the chemical process industries, closed pressure loadable chambers are used to process reactants where elevated temperatures and pressures are required to carry out varied unit processes and operations. One type of "pressure cooker" commonly employed on an industrial scale is an autoclave. It has long been used medically in the sterilization of drugs, vaccines, instruments, and for other products which are subject to modification or purification through heat and pressure.

Autoclaves commonly have lidded removable (or hingeable) tops which engage a peripheral sealing gasket which rides on a usually circular lip of the open vessel. The lid is secured to the pressure chamber upper edge via a plurality of headless bolts sized to threadingly engage a plurality of tapped holes in the lid member on its so-called hold-down ring. As the headless bolts are tightened from the outside of the vessel, they force the lid to exert a compressive force on the underlying circular gasket until the desired degree of hermetic seal is achieved. In actual operation of a sealed autoclave lid, the practical hazard of "frozen" bolts is not uncommon; nor is it one that is readily avoided, especially where processed materials create reactive vapors that attack the locking bolts from the exposed underside.

Aggravating conditions are elevated temperatures and pressures, extended corrosive operations and inadequate lubrication, any one of which can produce a "frozen" bolt. "Stuck" bolts often occur due to galling caused by thread imperfections, or occluded foreign materials, or leakage of vessel contents containing particulate materials conducive to producing high frictional loads upon separation.

In many instances, the successful removal of a "stuck" bolt by excessive wrenching efforts results in thread damage to both mating elements of the standard closure assembly, that is, the threaded bolt and the tapped lid passages receiving the bolt. Indeed, if the bolts cannot be loosened, or their wrenching surfaces become too damaged, the bolts must be machined out of the threaded tap while in the lid ring.

While locking bolts are comparatively economical and thus expendable, the involved closure ring of the lid is not, since it is fabricated in compliance with the boiler and pressure vessel codes. If these are compromised by destructive bolt removal steps, replacement of a closure ring is very costly. This takes extended time to remedy since the replacements will require hydrotesting, inspection and certification to comply with the codes.

Among the prior art approaches to closure means is a screw mounting means for use with an electrical outlet box. A clip member is to be slidably engaged in a slotted aperture adjacent an unthreaded screw receiving bore hole (see U.S. Pat. No. 3,955,463 to Hoehn). A threaded screw is fastened in the bore hole by being manually thrust into the bore hole without turning and engaging a spring detent with the screw threads.

Another prior art closure means is the so-called standoff assembly of U.S. Pat. No. 4,117,261 to Blevins, et al., in which a socket, sized to accept an insert, is fastened through a hole in a structural member. A shoulder is provided on the insert. The shoulder is located fully contiguous to the lip of the socket when the insert is fully bottomed. This form of plate locking device is not adaptable to an autoclave lid cover involving pressure services because severe conditions of elevated temperature (circa 750° F.) and attendant pressures (circa 4000 psig) cannot be accommodated by the referenced device.

Still another means for a structural closure is the removable fastening assembly of U.S. Pat. No. 4,606,688 to Moran, et al., which assembly is able to secure an externally threaded member to an article to an opening therein. Though this teaching is based on adjustable position take up screws, the assembly appears to be too fragile to be useful with heavy lidded pressure vessels.

It is a principal object of the invention to provide an economical and reliable closure assembly for pressure loaded vessels which is the functional equivalent of known peripheral locking bolt and tapped hole combination.

It is another object of the invention to provide an inexpensive and expendable closure assembly adaptable to existing autoclave lidded members which does not compromise the integrity of the compressive load carrying member and also includes readily replaceable elements in the event of a failure of the closure assembly release.

It is still another object to substitute the plural threaded tap holes being fabricated in the lid member (hold-down ring) with simple cylindrical bore holes (sockets) on the lid underside that will accommodate the novel closure assemblies of the present invention in the manner of the so-called "captive nut" fasteners, which are normally used where access to the "nut" side of the locking member is unavailable.

SUMMARY OF THE INVENTION

According to the present invention, there is provided a plurality of adjustable position lid locking closure members which will replace the known tap holes and companion bolts with internally threaded, but non-rotatable, inserts. These will threadingly engage standard headless threaded bolts, e.g., enlarged set screws. The internally threaded rigid inserts are arrayed in the periphery of the underside of the lid as counter bored sockets centered on the bolt passageways. They are held in position against gravity separation by a tailored configuration, a metal pin or snap ring that rests in an annular groove or channel provided on the lower edge of the main insert retaining socket.

After each insert is fitted and locked into its socket, a mating threaded bolt is rotatably worked into the barrel of the insert until it is securely engaged. When the peripheral array of lid closure assemblies is installed, the autoclave lid is engaged with the main body of the pressure vessel. In addition to the normal lid bearing weight exerted on the peripheral gaskets, the compressive load can be further augmented by manipulating the vertical position of each bolt within its lid-mounted insert. A tightening tool suited to the bolthead design will force the lid downwardly, causing the gasket to seal against the vessel. This requires lid hinging at some point on the lid periphery to provide the anchor point for variable lid compression.

To ensure that locking bolt rotation does not merely rotate the engaged insert along with it, due to their frictional engagement, the insert and the receiving socket preferably have a non-circular geometry in their horizontal dimensions, such as being ovoid, or have alternative mechanical means for precluding the threaded insert from rotating in lock step with the rotating bolt. Among several such means for preventing rotation are shear pins and key slots.

BRIEF DESCRIPTION OF THE DRAWINGS

The features, advantages and operation of the invention will be more apparent from the following Detailed Description of the Invention and Preferred Embodiment when read in connection with the accompanying drawings in which like numerals refer to like elements, and in which.

DETAILED DESCRIPTION

Figure 1:
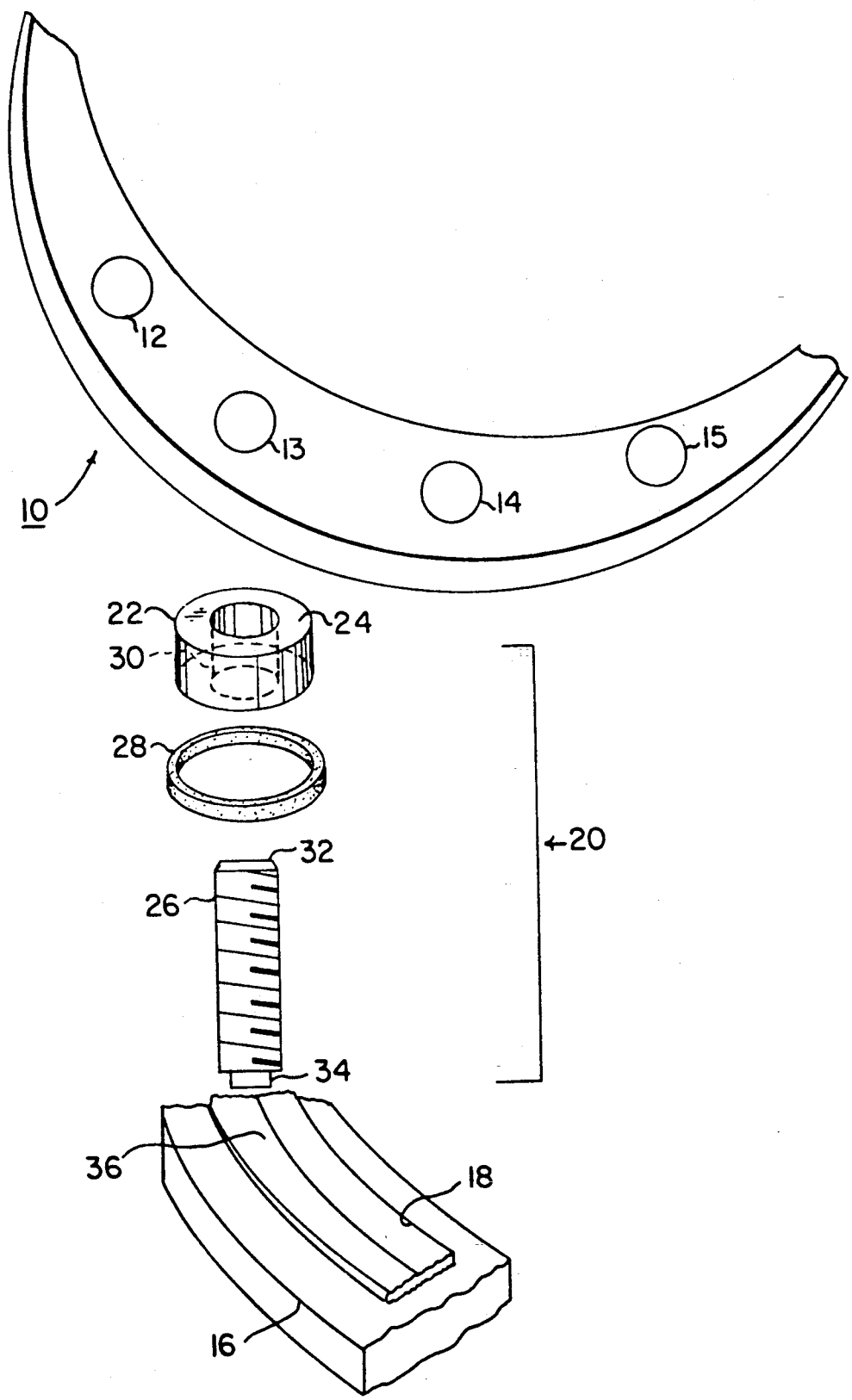
FIG. 1 is an exploded perspective view of the closure assembly of this invention and a fragmented part of the sealing gasket and vessel support lip to which the present assembly may be joined.

Referring now to the drawings, FIG. 1 presents an exploded perspective view of a preferred embodiment of this invention and a fragment of the peripheral edge of the sealing gasket 18 disposed on its underlying pressure vessel support lip 16.

A fragmentary portion of a circular pressure vessel cover, generally 10, is shown having a plurality of spaced apart bore holes, like 12 to 15. The pressure vessel and its cover 10 are often made from high tensile strength steel. From a top view, the bore holes 12-15 are seen as being generally cylindrical and are arrayed evenly along the entire periphery of cover 10 so as to provide for uniform compressive sealing of the cover 10 to the pressure vessel upper rim 16, on which is disposed a generally flat compressible annular sealing gasket 18.

The components of the present closure assembly, shown generally 20, are depicted as being spaced intermediate the lid periphery and the underlying vessel rim 16. Uppermost is a rigid, thick walled sleeve insert 22 (usually metallic) having an annular horizontal cross section 24 and being uniform on both top and bottom as to its planar surfaces. Sleeve 22 is preferably of a metal dissimilar to the companion bolt 26 (to be described) so as to preclude galling of the components during their intermittent frictional and threading engagement. Sleeve 22 can be made of any of brass, bronze, lead or copper alloy materials while the bolt 26 is of high tensile steel.

A rigid O-ring shaped component 28, of neoprene or other high temperature rubber substitute pliable material, functions as an abutting retainer for sleeve 22. It is sized to overlap the outer periphery of the undersurface (not shown) of the sleeve 22 and to extend beyond its periphery so as to effect a locking engagement with a cover under recess (counter bore) to be described.

Elongate linear headless bolt 26, much like an oversized set screw, is passed through O-ring 28 and threadingly engages the tapped inner surface 30 of sleeve 22. Bolt 26 is of a high tensile strength metal suitable for corrosive service, like 304 stainless steel. It is provided with a raised crown 32 on its upper axial end, having a diametric notch provided therein (not seen) adapted for topside accessing and for rotating of the bolt 26 while it is recessed in the bore hole 13 of cover 10 (FIG. 1). A planar tipped rigid lug 34 is provided on the lower axial end of bolt 26 and is adapted to make compressive contact along the centerline portion 36 of underlying compressive gasket 18.

Figure 2:
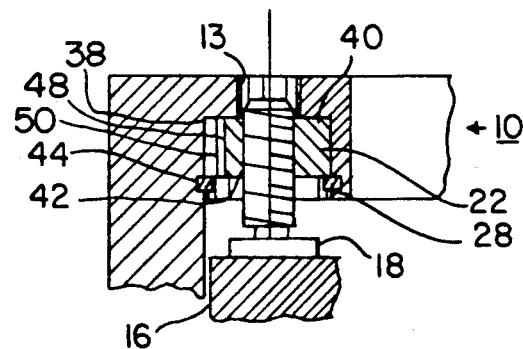
FIG. 2 shows a cross sectioned, side elevational view of the components of FIG. 1, assembled as in their co-operation with the lid and vessel sidewalls of a sealed pressure vessel structure.

The configuration and mode of cooperation and mating of the described components of the present closure assembly 20 are better seen in FIG. 2, which is a partially fragmented cross-sectional view of a side elevation of the closed pressure vessel 16. Sleeve insert 22 is located rather tightly within an axial counter bore 38, conveniently machined from the underside of cover 10. It is noted that the upper surface 40 of sleeve 22 is located intermediate the opposing external sides of cover 10, while the sleeve lower surface 42 is somewhat closer to the undersurface of cover plate 10. Ring retainer 28 is positioned abutting and outwardly overlapping the sleeve lower surface 42. It is retained along its outer periphery by an enlarged annular channel 44, abutting the first counter bore 38. With retainer 28 being pressure fitted into counter bore peripheral channel 44, the threaded sleeve 22 itself will also be held firmly in its counter bore recess 38 while the cover 10 is being lowered to the contact vessel upper lip 16.

As shown in FIG. 2, retainer element 28 has a substantially rectangular vertical cross section. Sleeve insert 22 and its support member counter bore 38 have uniform concentric configurations. Optionally each can have abutting vertical linear channels 48 which have parallel axes and are adapted to admit a linear rigid key of rectangular cross section 50 that serves as a brake against sleeve agitation with the member by the intermittent torque forces which are exerted upon engaged bolt 26.

Bolt 26 is shown in threading engagement (an intermediate position) with sleeve 22 in FIG. 2. As noted, rotation of the bolt 26 is accomplished by insertion of a typical torque tool (screwdriver) into exposed bore hole 13, to engage the notch (not seen) on the head of the bolt 26. The axially aligned lower lug 34 of the bolt 26 is seen in compressive contact with gasket 18 on vessel lip 16. Since the vessel cover 10 is usually hinged at one point along its periphery (not shown), the vertical position of bolt 26, relative to that of fixed position sleeve 22, determines the degree of compressive force being exerted upon gasket 18.

Figure 3:
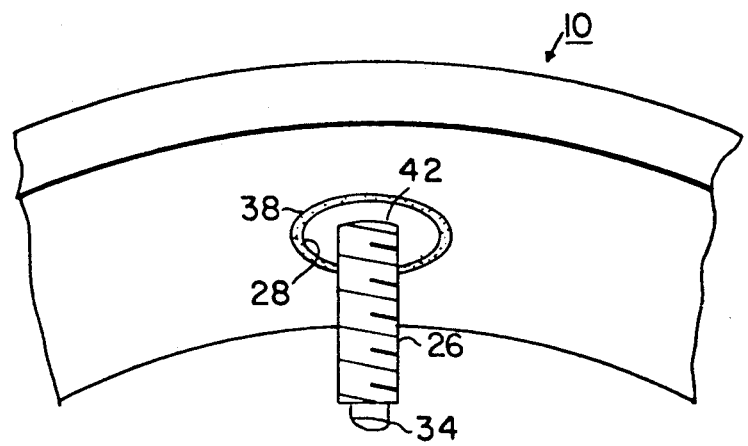
FIG. 3 is an underside perspective view of the assembled components of the invention as they are arranged within a peripheral socket of the pressure vessel lid and depicting a non-circular peripheral geometry.

In FIG. 3, an underside perspective view of the assembled closure components 20 is presented, better depicting the inner edge of O-ring retainer 28 disposed adjacent lower planar surface 42 of the sleeve 22. The degree of downward projection of bolt 26 (and its lug 34) is readily varied, as has been described, thus varying the resulting compressive force on gasket 18.

Figure 4:
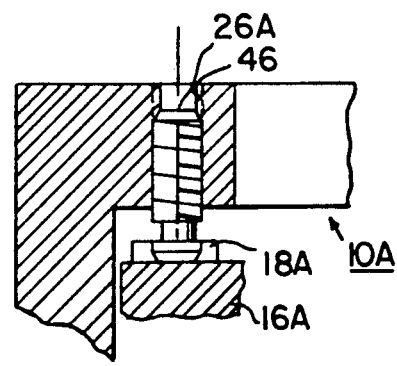
FIG. 4 shows a cross sectioned side elevation view of a locking bolt and associated tapped lid of a prior art closeable top pressure vessel.

The closure means of FIG. 4 is typical of the prior art devices in which a standard bolt 26A is threadingly engaged to the tapped vertical passageway 46 exposed in 10A. It is this conventional type of locking bolt that has long been the cause of "freezing" or "sticking" of bolted covers when it comes time for frequent cover lifting. As described, this often leads to major release work and sometimes more drastic remedial steps since all the bolts must be released in order to raise the cover for vessel recharging or maintenance of the autoclave type vessel.

In operations where the cover passageway 13 and the sleeve member 22 have an eccentric (such as ovoid) configuration, as depicted in FIG. 4, the autoclave cover 10 is lifted and turned back to its rest position, e.g., vertical or inclined from the vertical. Each of the peripheral coverage passageways 13 is further modified, as will be described in relation to just one of them. Insert sleeve 22 is slipped into the intermediate counter bore 38 which forms the main internal socket. While being digitally held in place, a retainer O-ring 28 is forced into the inner enlarged second counter bore, forming channel 44, where it frictionally engages the lower annular face 42 (see FIG. 3) of sleeve 22. When the cover is moved back to its vessel closure position (horizontal), the retainer ring 28 will preclude insert sleeve 22 from dropping free due to gravity effects. Prior to cover turndown, the conventional headless bolt 26 is threadingly engaged (notched end up) into insert 22 for most of its length. Only its inner end projects downwardly so that axial lug 34 will engage along the middle line of compressible sealing gasket 18.

When the hinged cover is in the closure mode, a rotational torque can be applied to bolt 26, and sleeve 22 moves up until it bears tightly against the underside shoulder 40 of the recessed socket 38. When service of the cover 10 is needed, the entire bolt and threaded insert can be dropped out from the cover bottom once the retaining O-ring 28 is removed.

It will be apparent that the present closure assembly 20 is suited to be mounted and/or removed from the underside of the lidded member into which the threaded bolt 26 is received. If ever the present assembly 20 becomes jammed, the laborious option of drilling out a "frozen" bolt is avoided by first springing loose retainer 28. This permits the "stuck" bolt 26 and mating sleeve insert 22 to drop from the cover recess 38. They are quickly replaced by a new assembly in the manner described above. Design engineering factors include adequate threading surface in the mating bolt 26 and sleeve 22 so that any shearing stress encountered in the pressure vessel can be supported by the closure assembly 20. The degree of compressive bearing loads on the closure assembly 20 must be factored into its fabrication. Such design parameters are readily met by straightforward calculations known to those skilled in the design of closeable pressure vessels.

Various modifications and alterations of this invention will become apparent to those skilled in the art without departing from the spirit of this invention. It should be understood that the foregoing description and accompanying drawings sets forth illustrative and preferred embodiments of this invention and they should not be construed in a limiting sense.

What is claimed is:

1. A pressure vessel cover adapted for sealing engagement with an outer peripheral lip of an underlying pressure vessel and having a compressible annular gasket overlying said lip, said cover further comprising:
   a) a spaced peripheral array of cylindrical bored passageways communicating between outer and inner planar surfaces of the vessel cover, with each of the passageways further comprising:
      i) a first counter bore concentric with the bored passageway and extending from the inner planar surface to a point intermediate ends of the passageway;
      ii) a second counter bore axially aligned with, of comparative minor height relative to, the first counter bore, extending to the first counter bore from the inner planar surface to a point intermediate the first counter bore;
   b) a rigid, comparatively thick-walled, annular sleeve insert which is internally tapped and externally sized to fit into the first counter bore;
   c) a substantially rigid retainer element configured to seat tightly against the inserted sleeve, having a diameter larger than that of the sleeve insert and being sized to fit frictionally into the second counter bore, thus serving to retain the sleeve insert in place despite gravity effects thereon; and
   d) bolt threaded to engage an inner surface of the positioned sleeve insert, said bolt having an outer axial end configured for tool rotation and an inner axial end having a planar lug coaxial with a center line of the compressible annular gasket resting on the underlying pressure vessel peripheral lip.

2. The pressure vessel cover according to claim 1 in which the sleeve insert and the first counter bore have an eccentric external and internal peripheral configuration, respectively, so that the sleeve is retained rigidly within the first counter bore when torque forces are exerted intermittently upon the threaded bolt.

3. The pressure vessel cover according to claim 1 in which the sleeve insert and the first counter bore have concentric configurations and each is provided with a linear channel, both of which have parallel axes and are adapted to admit a shear pin to preclude sleeve rotation when intermittent torque forces are exerted upon the engaged bolt.

4. The pressure vessel cover according to claim 1 in which the sleeve insert is of a dissimilar metal to that of the threaded bolt and is adapted to minimize galling potential between cooperating bolt and sleeve insert threaded surfaces.

5. The pressure vessel cover according to claim 4 in which the dissimilar metal of the sleeve is brass, bronze, lead, or copper and the bolt is high tensile steel.

6. The pressure vessel cover according to claim 1 in which the retainer element is made of metal.

7. The pressure vessel cover of claim 1 in which the sleeve insert has an ovoid shaped horizontal cross section.

8. The pressure vessel cover of claim 1 in which the retainer element has a substantially rectangular vertical cross section.

9. An adjustable closure assembly adapted for use with a pressure vessel cover ring in compressive contact with an annular gasket overlying an upper lip of a pressure vessel, comprising:
- a) a rigid, comparatively thick walled hollow sleeve insert having an eccentric horizontal cross section, said sleeve insert being tapped along an internal surface and being sized to frictionally engage a first cylindrical recess provided in the vessel cover ring;
- b) a substantially rigid O-ring retainer element having a vertical width sufficient to seat tightly against the sleeve insert while mounted in the first cylindrical recess and having a diameter adapted to pressure fit into a larger second cylindrical recess adjacent to, and axially aligned with, the first recess;
- c) a compression adjusting bolt to threadingly engage the internal surface of said sleeve, said bolt having a diametric notch on an outer axial end for tool rotation and a planar end lug on an inner axial end, said lug being substantially coaxial with a centerline of the compressible sealing gasket retain on an underlying rigid annular surface.

10. The closure assembly according to claim 9 in which both the sleeve insert and a counter bore of a corresponding assembly support member have ovoid external and internal peripheral configurations, respectively, whereby the sleeve is retained rigidly within the counter bore when torque forces are exerted upon the threadingly engaged compression adjusting bolt.

11. The closure assembly according to claim 9 in which the sleeve insert is of a dissimilar metal to that of the compression adjusting bolt and is adapted to minimize galling potential between bolt and sleeve insert threaded surfaces.

12. The closure assembly according to claim 11, in which the dissimilar metal of the sleeve is brass, bronze, lead, or copper and the bolt is high tensile steel.

13. The closure assembly according to claim 9 in which the retaining O-ring includes a neoprene-like material.

14. The closure assembly of claim 9 in which the O-ring retainer element has a substantially rectangular vertical cross section.

* * * * *